(12) United States Patent
Günther et al.

(10) Patent No.: US 11,273,605 B2
(45) Date of Patent: Mar. 15, 2022

(54) INTEGRATED PRINT HEAD MAINTENANCE STATION FOR POWDER BED-BASED 3D PRINTING

(71) Applicant: Voxeljet AG, Friedberg (DE)

(72) Inventors: Daniel Günther, Munich (DE); Christian Wehrmann, Rehling (DE); Wolfgang Mühlbauer, Augsburg (DE)

(73) Assignee: VOXELJET AG, Friedberg (DE)

( * ) Notice: Subject to any disclaimer, the term of this patent is extended or adjusted under 35 U.S.C. 154(b) by 295 days.

(21) Appl. No.: 16/344,666

(22) PCT Filed: Nov. 8, 2017

(86) PCT No.: PCT/DE2017/000375
§ 371 (c)(1),
(2) Date: Apr. 24, 2019

(87) PCT Pub. No.: WO2018/091007
PCT Pub. Date: May 24, 2018

(65) Prior Publication Data
US 2020/0055246 A1 Feb. 20, 2020

(30) Foreign Application Priority Data
Nov. 15, 2016 (DE) ................. 10 2016 013 610.3

(51) Int. Cl.
*B29C 64/35* (2017.01)
*B29C 64/209* (2017.01)
*B29C 64/165* (2017.01)
*B33Y 40/00* (2020.01)

(52) U.S. Cl.
CPC ............ *B29C 64/35* (2017.08); *B29C 64/165* (2017.08); *B29C 64/209* (2017.08); *B33Y 40/00* (2014.12)

(58) Field of Classification Search
CPC ..... B29C 64/35; B29C 64/165; B29C 64/209; B41J 2/16505; B41J 2/16417; B41J 2/16538
See application file for complete search history.

(56) References Cited

U.S. PATENT DOCUMENTS

| 4,247,508 A | 1/1981 | Housholder |
| 4,575,330 A | 3/1986 | Hull |
| 4,665,492 A | 5/1987 | Masters |

(Continued)

FOREIGN PATENT DOCUMENTS

| AU | 720255 B2 | 5/2000 |
| CN | 101146666 A | 3/2008 |

(Continued)

OTHER PUBLICATIONS

US 4,937,420 A, 06/1990, Deckard (withdrawn)
(Continued)

*Primary Examiner* — Mary Lynn F Theisen
(74) *Attorney, Agent, or Firm* — The Dobrusin Law Firm, P.C.

(57) ABSTRACT

The invention relates to a method and a device for protecting a print head (100) during layer-by-layer manufacture of a shaped part (103) using the binder jetting process, in which a plurality of elements required for preserving print head function act, and are housed, in a space which is partially sealed off by a gap seal (800).

26 Claims, 11 Drawing Sheets

(56) References Cited

U.S. PATENT DOCUMENTS

| | | | |
|---|---|---|---|
| 4,752,352 A | 6/1988 | Feygin |
| 4,752,498 A | 6/1988 | Fudim |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,059,266 A | 10/1991 | Yamane et al. |
| 5,120,476 A | 6/1992 | Scholz |
| 5,126,529 A | 6/1992 | Weiss et al. |
| 5,127,037 A | 6/1992 | Bynum |
| 5,134,569 A | 7/1992 | Masters |
| 5,136,515 A | 8/1992 | Helinski |
| 5,149,548 A | 9/1992 | Yamane et al. |
| 5,155,324 A | 10/1992 | Deckard et al. |
| 5,156,697 A | 10/1992 | Bourell et al. |
| 5,248,456 A | 8/1993 | Evans, Jr. et al. |
| 5,252,264 A | 10/1993 | Forderhase et al. |
| 5,284,695 A | 2/1994 | Barlow et al. |
| 5,342,919 A | 8/1994 | Dickens, Jr. et al. |
| 5,352,405 A | 10/1994 | Beaman et al. |
| 5,387,380 A | 2/1995 | Cima et al. |
| 5,398,193 A | 3/1995 | deAngelis |
| 5,503,785 A | 4/1996 | Crump et al. |
| 5,518,060 A | 5/1996 | Cleary et al. |
| 5,518,680 A | 5/1996 | Cima et al. |
| 5,555,176 A | 9/1996 | Menhennett et al. |
| 5,637,175 A | 6/1997 | Feygin et al. |
| 5,639,070 A | 6/1997 | Deckard |
| 5,639,402 A | 6/1997 | Barlow et al. |
| 5,647,931 A | 7/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,749,041 A | 5/1998 | Lakshminarayan et al. |
| 5,753,274 A | 5/1998 | Wilkening et al. |
| 5,824,250 A | 10/1998 | Whalen |
| 5,851,465 A | 12/1998 | Bredt |
| 5,884,688 A | 3/1999 | Hinton et al. |
| 5,902,537 A | 5/1999 | Almquist et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 6,048,188 A | 4/2000 | Hull et al. |
| 6,048,954 A | 4/2000 | Barlow et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,193,922 B1 | 2/2001 | Ederer |
| 6,210,625 B1 | 4/2001 | Matsushita |
| 6,217,816 B1 | 4/2001 | Tang |
| 6,243,616 B1 | 6/2001 | Droscher et al. |
| 6,259,962 B1 | 7/2001 | Gothait |
| 6,270,335 B2 | 8/2001 | Leyden et al. |
| 6,305,769 B1 | 10/2001 | Thayer et al. |
| 6,335,097 B1 | 1/2002 | Otsuka et al. |
| 6,375,874 B1 | 4/2002 | Russell et al. |
| 6,403,002 B1 | 6/2002 | Van Der Geest |
| 6,405,095 B1 | 6/2002 | Jang et al. |
| 6,423,255 B1 | 7/2002 | Hoechsmann et al. |
| 6,500,378 B1 | 12/2002 | Smith |
| 6,554,600 B1 | 4/2003 | Hofmann et al. |
| 6,596,224 B1 | 7/2003 | Sachs et al. |
| 6,658,314 B1 | 12/2003 | Gothait |
| 6,672,343 B1 | 1/2004 | Perret et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,827,988 B2 | 12/2004 | Krause et al. |
| 6,830,643 B1 | 12/2004 | Hayes |
| 6,838,035 B1 | 1/2005 | Ederer et al. |
| 6,896,839 B2 | 5/2005 | Kubo et al. |
| 7,120,512 B2 | 10/2006 | Kramer et al. |
| 7,153,463 B2 | 12/2006 | Leuterer et al. |
| 7,291,002 B2 | 11/2007 | Russell et al. |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,455,805 B2 | 11/2008 | Oriakhi et al. |
| 7,497,977 B2 | 3/2009 | Nielsen et al. |
| 7,597,835 B2 | 10/2009 | Marsac |
| 7,641,461 B2 | 1/2010 | Khoshnevis |
| 7,790,096 B2 | 9/2010 | Merot et al. |
| 7,799,253 B2 | 9/2010 | Höchsmann et al. |
| 8,186,415 B2 | 5/2012 | Marutani et al. |
| 8,574,485 B2 | 11/2013 | Kramer |
| 8,951,033 B2 | 2/2015 | Höchsmann et al. |
| 9,327,450 B2 | 5/2016 | Hein et al. |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2002/0186270 A1 | 12/2002 | Sharma |
| 2003/0004599 A1 | 1/2003 | Herbak |
| 2003/0083771 A1 | 5/2003 | Schmidt |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0094058 A1 | 5/2004 | Kasperchik et al. |
| 2004/0112523 A1 | 6/2004 | Crom |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0231593 A1* | 11/2004 | Edwards ............ B41J 2/04581 118/719 |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0079086 A1 | 4/2005 | Farr |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0225007 A1* | 10/2005 | Lai ................ B29C 64/165 264/308 |
| 2005/0276976 A1 | 12/2005 | Pfeifer et al. |
| 2005/0280185 A1 | 12/2005 | Russell et al. |
| 2006/0012058 A1 | 1/2006 | Hasei |
| 2006/0103054 A1 | 5/2006 | Pfeifer et al. |
| 2006/0105102 A1 | 5/2006 | Hochsmann et al. |
| 2006/0159896 A1 | 7/2006 | Pfeifer et al. |
| 2006/0175346 A1 | 8/2006 | Ederer et al. |
| 2006/0208388 A1 | 9/2006 | Bredt et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni |
| 2007/0057412 A1 | 3/2007 | Weiskopf et al. |
| 2007/0126157 A1 | 6/2007 | Bredt |

(56) References Cited

U.S. PATENT DOCUMENTS

| | | |
|---|---|---|
| 2007/0238056 A1 | 10/2007 | Baumann et al. |
| 2007/0241482 A1 | 10/2007 | Giller et al. |
| 2008/0001331 A1 | 1/2008 | Ederer |
| 2008/0003390 A1 | 1/2008 | Hayashi |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0068376 A1 | 3/2009 | Philippi et al. |
| 2010/0007048 A1 | 1/2010 | Schweininger |
| 2010/0007062 A1 | 1/2010 | Larsson et al. |
| 2010/0212584 A1 | 8/2010 | Ederer et al. |
| 2010/0207288 A1 | 9/2010 | Enrico |
| 2010/0244301 A1 | 9/2010 | Ederer et al. |
| 2010/0247703 A1* | 9/2010 | Shi .................. B29C 64/165 425/375 |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kahani-Shirazi |
| 2010/0323301 A1 | 12/2010 | Tang et al. |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2012/0046779 A1 | 2/2012 | Pax et al. |
| 2012/0097258 A1 | 4/2012 | Harmann et al. |
| 2012/0113439 A1 | 5/2012 | Ederer et al. |
| 2012/0126457 A1 | 5/2012 | Abe et al. |
| 2012/0291701 A1 | 11/2012 | Grasegger et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0141491 A1* | 6/2013 | Krichtman ............. B33Y 30/00 347/30 |
| 2013/0199444 A1 | 8/2013 | Hartmann |
| 2013/0234355 A1 | 9/2013 | Hartmann et al. |
| 2013/0302575 A1 | 11/2013 | Mogele et al. |
| 2014/0048980 A1 | 2/2014 | Crump et al. |
| 2014/0065194 A1 | 3/2014 | Yoo |
| 2014/0212677 A1 | 7/2014 | Gnuchtel et al. |
| 2014/0227123 A1 | 8/2014 | Gunster |
| 2014/0271961 A1 | 9/2014 | Khoshnevis |
| 2014/0306379 A1 | 10/2014 | Hartmann et al. |
| 2015/0042018 A1 | 2/2015 | Gunther et al. |
| 2015/0110910 A1 | 4/2015 | Hartmann et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375419 A1 | 12/2015 | Gunther et al. |
| 2016/0001504 A1* | 1/2016 | Ikeda .................. B29C 67/0059 264/255 |
| 2016/0318251 A1 | 3/2016 | Ederer et al. |
| 2016/0151973 A1* | 6/2016 | Juan Jover ............ B29C 64/386 264/462 |
| 2016/0243805 A1* | 8/2016 | Satoh .................... B29C 64/153 |
| 2016/0263828 A1 | 9/2016 | Ederer et al. |
| 2016/0303616 A1* | 10/2016 | Bredt ..................... B65B 3/14 |
| 2016/0303762 A1 | 10/2016 | Gunther |
| 2016/0311167 A1 | 10/2016 | Gunther et al. |
| 2016/0311210 A1 | 10/2016 | Gunther et al. |
| 2017/0050378 A1 | 2/2017 | Ederer |
| 2017/0106595 A1 | 4/2017 | Gunther et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0210037 A1 | 7/2017 | Ederer et al. |
| 2017/0297263 A1 | 10/2017 | Ederer et al. |
| 2017/0305139 A1 | 10/2017 | Hartmann |
| 2017/0355137 A1 | 12/2017 | Ederer et al. |
| 2018/0065293 A1* | 3/2018 | Jeon ..................... B29C 64/112 |
| 2018/0079133 A1 | 3/2018 | Ederer et al. |
| 2018/0141271 A1 | 5/2018 | Gunter et al. |
| 2018/0326662 A1 | 11/2018 | Gunther et al. |
| 2018/0369910 A1 | 12/2018 | Gunter et al. |
| 2019/0047218 A1 | 2/2019 | Ederer et al. |
| 2019/0084229 A1 | 3/2019 | Gunther |

FOREIGN PATENT DOCUMENTS

| | | |
|---|---|---|
| DE | 3221357 A1 | 12/1983 |
| DE | 3930750 C2 | 3/1991 |
| DE | 4102260 A1 | 7/1992 |
| DE | 4305201 C1 | 4/1994 |
| DE | 4 325 573 A1 | 2/1995 |
| DE | 29506204 U1 | 6/1995 |
| DE | 4440397 | 9/1995 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 69634921 T2 | 12/2005 |
| DE | 201 22 639 U1 | 11/2006 |
| DE | 102006040305 A1 | 3/2007 |
| DE | 102006029298 A1 | 12/2007 |
| DE | 102007040755 A1 | 3/2009 |
| DE | 102007047326 A1 | 4/2009 |
| DE | 102011053205 A1 | 3/2013 |
| EP | 0361847 B1 | 4/1990 |
| EP | 1415792 | 5/2004 |
| EP | 1457590 A | 9/2004 |
| GB | 2297516 A | 8/1996 |
| JP | S62275734 A | 11/1987 |
| JP | 2003/136605 A | 5/2003 |
| JP | 2004/082206 A | 3/2004 |
| JP | 2009/202451 A | 9/2009 |
| WO | 90/03893 A1 | 4/1990 |
| WO | 01/40866 A2 | 6/2001 |
| WO | 2004/014637 A1 | 2/2004 |
| WO | 2006/100166 A1 | 9/2006 |
| WO | 2008/049384 A1 | 5/2008 |
| WO | 2008/061520 A2 | 5/2008 |
| WO | 2011/063786 A1 | 6/2011 |
| WO | 2013/075696 A1 | 5/2013 |
| WO | 2014/090207 A1 | 6/2014 |
| WO | 2014/166469 A1 | 10/2014 |
| WO | 2016/019942 A1 | 2/2016 |
| WO | 2017/008777 A1 | 1/2017 |

OTHER PUBLICATIONS

International Search Report and Written Opinion, PCT Application No. PCT/DE2017/000375, dated Mar. 21, 2018.
Marcus et al., Solid Freedom Fabrication Proceedings, Nov. 1993.
Cima et al., "Computer-derived Microstructures by 3D Printing: Bio- and Structural Materials," SFF Symposium, Austin, TX, 1994.
Marcus, et al., Solid Freeform Fabrication Proceedings, Sep. 1995, pp. 130-133.
Gebhart, Rapid Prototyping, pp. 118-119, 1996.
Feature Article—Rapid Tooling—Cast Resin and Sprayed Metal Tooling by Joel Segal, Apr. 2000.
EOS Operating Manual for Laser Sintering Machine with Brief Summary Feb. 22, 2005.
Sachs, E., P. Williams, D. Brancazio, M. Cima, and K. Kremmin, Three dimensional printing: Rapid Tooling and Prototypes Directly from a CAD Model. In Proceedings of Manufacturing International 1990 (Atlanta, GA, Mar. 25-28). ASME, New York, 1990, pp. 131-136.
Sachs et al., "Three-Dimensional Printing: Rapid Tooling and Prototypes Directly from a CAD Model", Massachusetts Institute of Technology, pp. 143-151, Jan. 1990.
Williams, "Feasibility Study of Investment Casting Pattern Design by Means of Three Dimensional Printing", Department of Mechanical Engineering, abstract only; Sep. 25, 2001.

(56) References Cited

OTHER PUBLICATIONS

Armin Scharf, "Erster 3D-Endlosdrucker", zwomp.de, http://www.zwomp.de/2012/11/06/voxeljet-endlosdrucker/ dated Nov. 6, 2012.
Screen shots of URL: http://www.youtube.com/watch?v=hgIrNXZjIxU taken in approximately 5 second intervals on Nov. 12, 2015.
Jacobs et al., 2005 SME Technical Paper, title "Are QuickCast Patterns Suitable for Limited Production?".

* cited by examiner a)

b)

INTEGRATED PRINT HEAD MAINTENANCE STATION FOR POWDER BED-BASED 3D PRINTING

The invention relates to a unit for parking and/or maintenance of a print head in a device for producing three-dimensional models, and to methods and devices including the unit.

FIELD OF THE INVENTION

European Patent EP 0 431 924 B1 describes a process for producing three-dimensional objects based on computer data. In the process, a thin layer of particulate material is deposited on a platform and has a binder material selectively printed thereon by means of a print head. The particulate region with the binder printed thereon bonds and solidifies under the influence of the binder and, optionally, an additional hardener. Next, the platform is lowered by one layer thickness into a construction cylinder and provided with a new layer of particulate material, the latter also being printed on as described above. These steps are repeated until a certain desired height of the object is achieved. Thus, the printed and solidified regions form a three-dimensional object.

Upon completion, the object made of solidified particulate material is embedded in loose particulate material, from which it is subsequently freed. For this purpose a suction device may be used, for example. This leaves the desired objects which then have to be freed from any powder adhering to them, e.g. by brushing them off manually.

3D printing on the basis of pulverulent materials and introduction of liquid binders is the quickest method among the layer construction techniques. This method allows the processing of different particulate materials, including—as a non-exhaustive example—natural biological raw materials, polymeric plastic materials, metals, ceramics and sands.

In the above-mentioned method, the print head constitutes a central element of the device and method. The reliability of the machine correlates directly with the reliability of droplet generation.

In order to achieve high performance in the process, the print head is made up of a plurality of nozzles. Said nozzles are microtechnical actuators capable of accelerating the fluid in single droplets in the direction of the construction field.

In the print heads of the prior art, the function of generating droplets is achieved by piezo elements. Said piezo elements are arranged around a pump chamber and, when stimulated by an electrical signal, may suddenly change the volume of this exact chamber. The chamber is usually filled with liquid and in communication with a nozzle channel and a nozzle. The sudden change in volume allows a droplet to be ejected through said nozzle.

The described microtechnical arrangement is very sensitive to disturbance. For example, air in the pump chamber drastically impairs its function. Minimal quantities of air prevent droplets from being ejected. The system also responds sensitively to soiling. Such soiling, if located in the channels, may prevent droplets forming or have a negative impact on the trajectory of the droplet.

In order to ensure the droplet-forming function, the prior art resorts to various measures during and after the actual printing: Before printing, the print head is purged so as to expel any air that may be present in the pump chambers. After this, it is generally useful to clean the print head. The cleaning serves, on the one hand, to remove the droplets attached to the print head. Secondly, cleaning with contact allows to remove any particles or other adhesions. This is generally followed by what is called spitting. Spitting corresponds to the actual printing operation, but not yet in the product area, so that any cleaning fluid which may have gotten onto the print head by the cleaning operation does not have an effect on the production of components by 3D printing.

Capping is another important function. This function protects the print head from drying out and ingress of foreign materials before and after the actual printing process.

According to the prior art, a plurality of device parts are arranged for this function in different locations on the machine. Each device part has technical subfunction parts which protect the respective function against damage from the outside. Usually, moving parts are present which are controlled via actuators.

All individual elements of the print head maintenance unit are susceptible to soiling and malfunction.

Therefore, it is an object of the present invention to provide a device and a method which are less susceptible or not susceptible at all to soiling, adhesions and contamination, or to avoid, at least partly or entirely, the disadvantages of the prior art. Another object of the present invention is to provide a simpler maintenance unit for print heads or to at least simplify the disadvantages of the known different maintenance and capping stations.

BRIEF SUMMARY OF THE INVENTION

The above objects are achieved by a method and a device for protecting the print head in layered construction by means of the binder jetting process, wherein a plurality of elements required to maintain the print head function act and are accommodated in a space partly sealed by a gap seal. The device will be referred to hereinafter as an integrated maintenance unit.

Said space is limited by a wall with a trough-like shape. The upper edge of the trough is located at a certain distance from the print head. The print head can be positioned in the effective area of the integrated maintenance unit by cartesian movements, without having to move the trough.

EMBODIMENTS AND ASPECTS OF THE INVENTION

Several terms according to the invention will be explained in more detail below.

In the sense of the invention, "3D printing methods" are all methods known from the prior art which enable the construction of parts in three-dimensional molds and are compatible with the described process components and devices.

"Selective binder application" or "selective binder system application" in the sense of the invention may be effected after each particulate material application or irregularly, i.e. non-linearly and parallel after each particulate material application, depending on the requirements for the molded article and for optimisation of the molded article production. Thus, "selective binder application" or "selective binder system application" may preferably be adjusted individually, during the course of the molded article production.

A "molded article" or "part" in the sense of the invention means three-dimensional objects manufactured by means of the method according to the invention or/and the device according to the invention and exhibiting dimensional stability.

The "device" used for carrying out the method according to the invention may be any known 3D-printing device which includes the required parts. Common components include coater, construction field, means for moving the construction field or other parts, a metering device and heating means, UV lamps and other parts which are known to the person skilled in the art and will therefore not be described in detail herein.

The "particle materials" of use herein may be any materials known for powder-based 3D printing, in particular sands, ceramic powders, metal powders, plastic materials, wood particles, fibre materials, celluloses or/and lactose powders. The particulate material is preferably a free-flowing powder when dry, but a cohesive, cut-resistant powder may also be used.

The "construction space" is the geometric location where the particulate material bed grows during the construction process by repeated coating with particulate material. The construction space is generally bounded by a bottom, i.e. the construction platform, by walls and an open top surface, i.e. the construction plane.

"IR heating" as used herein means irradiation of the construction field by an IR radiator. The radiator may be either static or movable over the construction field by a displacement unit. The terms drying and hardening are not meant to be synonymous.

"Drying" means the loss of a certain volume of water. Such drying is the result of humidity being released to the ambient air. Drying is linked with hardening.

"Hardening" refers to an increase in the strength of a part. In water glass-based systems, hardening may occur by drying or chemical hardening.

"Dissolution" means the process of a formerly solid constituent passing into solution by the use of a solvent-based liquid. The dissolution process depends on various factors. These include exposure time, temperature, the relative quantity of solvent and the type of solid used.

A "print head" in the sense of the invention means a device part which has a surface turned towards the construction field that includes micro nozzles by which droplets can be selectively discharged onto the construction field. The nozzles are arranged in an area of said surface which is at a certain distance from the edge of the surface. Said surface is substantially impervious to vapors or liquids or only has minor gaps. Also, the print head may be substantially impervious above said surface.

"Nozzle" refers to an opening in the print head from which droplets can be selectively discharged. A nozzle is generally very small. In the method and device of the invention, nozzles with a diameter of 10-300 μm are considered.

"Meniscus" refers to the liquid level in a nozzle in standby mode. It is defined by a certain negative pressure in the fluid system and the surface tension of the liquid.

An "air pocket" means air entrapped in the fluid system near the nozzle. Such an air pocket may form e.g. by evaporation of fluid. In the area of said air pocket, binder or constituents of the fluid may solidify or corrosion may be promoted by admission of air.

"Capping" in the sense of the invention is a function which protects the print head from changing during "non-use". In most cases, capping serves to prevent the binder from drying out and to keep the print head functional until its next printing operation.

A "seal" in the sense of the invention is a contacting element which prevents the exchange of air between the environment and the capping sponge.

Herein, a "prop" means a movable element which can be moved towards the print head from below.

A "sponge" or "capping sponge" in the sense of the invention is an open-pore structure that can bind fluid. In this case, the fluid is retained in the sponge by a capillary effect. In the prior art, a sponge is pressed against the print head.

According to the invention, a contactless seal (gap seal) prevents the print head drying out during capping. A "seal gap" reduces the exchange of steam between the chambers of the system. In this case, a gap is considered to be a distance of less than 5 mm between two structures.

An "anti-spill element" is understood to be a cover arranged near the liquid level to prevent large quantities of liquid level starting to move upon stimulation and potentially reaching sensitive parts of the print head, such as the electronic system.

An "overflow siphon" is a pipe installed in the capping trough. For example, it protrudes into the liquid from below. Any liquid above the level of the overflow siphon will drain through the siphon. This results in the fluid level regulating itself, at least above the siphon.

A "wiping lip" in the sense of the invention is a passive wiping element, and when the print head touches it while passing over it, any liquid at the lower end of the print head is pushed up, thus wiping the print head dry and optionally also removing any dirt.

The "spitting structure" is an element adapted to catch any free-flying droplets generated by the print head, before they can follow air flows in the 3D printing device as an aerosol in an uncontrolled manner.

The invention further relates to the following aspects and preferred embodiments.

In one aspect, the invention relates to a maintenance and/or parking unit (parking station) for print heads, which is characterized in that said unit includes a gap seal.

In another aspect, the invention relates to a system comprising a print head and a maintenance and/or parking unit (parking station), wherein the print head, in its position retracted into the maintenance unit, substantially does not touch the components of the maintenance station and includes a gap seal.

The system or the maintenance and/or parking unit may further be characterized in that it comprises a trough which is preferably sealed and can be filled with a liquid, and which preferably comprises a liquid inlet and outlet and/or an anti-spill element or/and a spitting structure or/and a means for removing liquid from the print head.

The system or the maintenance and/or parking unit may further be characterized in that it comprises a first liquid connection preferably for a capping liquid, for feeding a liquid into the trough or/and a second liquid connection for overflow and draining from the trough, the drain preferably being an overflow connection.

In further embodiments, the system or the maintenance and/or parking unit may be characterized in that the first and/or the second liquid connection is connected to one or more flexible tubes and/or the latter are connected to catchment means, preferably one or more storage means, preferably a storage reservoir, and/or at least one of the flexible tubes is connected to a pump for filling the trough.

Furthermore, the system or the maintenance and/or parking unit may be characterized in that the trough has a chamfer, which is preferably circumferential or/and has an angle of 40 to 50°, preferably of 45°, or/and a length of 2 to 4 mm, preferably of 3 mm, or/and a depth of 10 to 50 mm, preferably of 30 mm, or/and comprises flexible means for attachment, preferably springs or coil springs.

In a preferred embodiment, the system or the maintenance and/or parking unit is characterized in that the unit comprises 2, 3, 4, 5, or 6 flexible means, preferably coil springs.

Furthermore, the system or the maintenance and/or parking unit may be characterized in that the unit comprises a stop, preferably an upper stop, against which the trough can be moved by the flexible means.

In preferred embodiments, the system or the maintenance and/or parking unit may be characterized in that the stop is adjustable by adjusting means, preferably by means of adjusting screws, and the distance from the print head to the upper edge of the trough is preferably set to 0.1 to 5 mm, preferably 0.4 to 1 mm, more preferably 0.5 mm.

In further embodiments, the system or the maintenance and/or parking unit may be characterized in that the bending force or spring force of the flexible means is greater than the weight force of the trough filled with liquid, preferably in that the bending force or spring force is 10 to 30 N, preferably at least 20 N, greater than the weight force of the trough filled with liquid.

In a preferred embodiment, the system or the maintenance and/or parking unit may be characterized in that the means for removing liquid is a wiping lip.

In another aspect, the invention relates to a method for cleaning print heads, wherein the steps of purging, removing excess liquid and, optionally, dirt from the print head, and spitting are carried out in one unit (maintenance unit).

Preferably, a maintenance and parking unit as described above can be used in the method.

In preferred embodiments of the method, a maintenance unit as described above is approached by the print head, without substantially touching the maintenance unit, and in a first step a purging operation is carried out, in a second step excess liquid and, optionally, dirt are removed from the print head by passing over the wiping lip, and in a third step a spitting operation is carried out, or each of these steps may be carried out independently of the other steps.

In further embodiments, the method is designed such that, after steps 1 to 3 have been carried out, or after each of the steps, the print head remains in the maintenance unit or a printing process is carried out.

The invention advantageously achieves that maintenance or capping units previously present in different positions in a 3D printing machine are now combined in one single maintenance and capping unit.

This has various advantages, which contribute to simplification and cost reduction in machines of this type. Likewise, a 3D printing method is also simplified by the use of a maintenance and parking station according to the invention, and the procedure includes fewer stop positions, which saves time and may accelerate the procedure.

A further advantage of the invention results from the simplification of a 3D printing machine in such a way that several structural and functional parts are combined in one unit. Furthermore, the aspects of the previously used individual units are simplified in construction. This not only results in cost reduction, but also reduces the need for maintenance. Furthermore, the cleaning operation becomes more reliable, and the disadvantages of known components are improved. For example, fewer mechanical elements and thus fewer moving parts are used, which are susceptible to wear and, thus, costly. Moreover, the 3D printing machine can now be designed in a more compact manner, which is desirable in many ways.

The inventive concept of a contactless seal has turned out to be particularly advantageous, because it advantageously avoids the disadvantages of the print head and the capping sponge coming into contact with each other. Surprisingly, using this contactless seal also allows to keep the print head moist enough at rest or between two printing processes to maintain its functionality. Furthermore, the concept of the invention allows binder concentrations, soiling and unreliability to be reduced or avoided altogether.

FURTHER EMBODIMENTS

The device and method according to the invention are used in a system for for the layered construction of models using inkjet printing technology. The sequence of a manufacturing cycle according to the prior art is structured as follows: A powder layer is applied onto a construction platform and then leveled. Next, the layer has a fluid printed thereon according to the layer data of the 3D model. A portion of the material may be stored for bonding the particles in the powder in the form of dry particles. After the printing process, the construction platform is lowered and the process starts anew. Selectively and in certain printing machine constructions, the printing unit and other structures involved in the printing process may also be raised.

These steps are repeated until the part is present completely in the powder cake built up at the same time.

The print head includes several nozzles. Depending on its design, there may be several 10,000. These nozzles are used to produce individual droplets upon an electrical signal. Due to the microtechnological construction, the sequence of droplets may be very quick. According to the prior art, a droplet generation frequency of 30 kHz and more is common.

The droplet generation process only works if certain boundary conditions are adhered to.

The pump chambers in which the pressure surge for the droplet is generated by a piezo crystal must not contain any air. The air would allow itself to be compressed and thus prevent propagation of the pressure surge. So, despite the signal, no droplet would form at the respective nozzle. The air may be dissolved, for example, in the fluid and not appear until inside the pump chamber.

Soiling also interferes with the droplet generation process. It may be caused, for example, by particles from the construction process. They may swirl around as dust in the construction space or, for example, they may be stirred up by the print head shooting droplets onto the construction field itself and may adhere to the print head. If the particles are near the nozzle, they impair the precision of the droplets' trajectory. If a particle is located directly in a nozzle, droplet generation is prevented completely.

Thickened or sticky fluids are also detrimental to functioning. For example, by evaporation of solvent in the area of the nozzle, the fluid may thicken locally to such a degree that no more droplets can be generated. Likewise, the fluid may thicken by evaporation to such an extent that it forms an insoluble clot in the nozzle, permanently damaging the latter.

In order to keep the print head from drying out, the prior art uses capping. As the English word says, a cap is placed on the print head to form an air seal or prevent evaporation of the printing liquid.

The capping usually involves a seal which is placed on the lower surface of the print head. For this purpose, the capping consists of a prop which is pushed onto the print head from below. To this end, the print head is placed in the capping position and the prop is moved towards the print head from below. The prop may be actuated, for example, by a pneumatic cylinder or a mechanical system which is triggered by the movement of the print head, such as illustrated in FIG. 5, part a.

A capping liquid is present to prevent drying out. In many cases, said capping liquid is bound in the prop by a sponge. The latter is brought into contact with the print head in the area of the nozzles, such as illustrated in FIG. 5, part b.

Since the nozzles are highly sensitive to soiling, both the seal and the sponge must be free from dirt. For this purpose, the capping usually comprises a slider. The latter separates the sponge and the seal from the actual construction space of the 3D printer, such as illustrate in FIG. 6, parts a and b.

All mechanically moved components are strongly influenced by the use of sticky binders or fluids which become sticky upon drying.

Prior art devices often have problems with stuck sliders or jammed mechanical parts. In the worst case, this may cause seals to be damaged or torn off, such as illustrate in FIG. 7, parts a and b.

All print head maintenance functions during the process are mechanically complex and susceptible to soiling resulting from the process technology.

According to the invention, such susceptibility to soiling, the seal contact and the spatial expansion of the elements are to be reduced.

This is achieved by a trough-shaped device whose upper edge is located just below the lower edge of the print head. According to the invention, distances of less than 5 mm, preferably less than 3 mm and particularly preferably less than 1 mm are useful in this case.

In this way, a gap seal is formed, allowing little material from the construction space of the 3D printer to enter into the maintenance unit and little vapor from the maintenance unit to escape from the maintenance unit.

The gap should be as small as possible. The print head moves with its axial system over the trough-like maintenance unit. In the process, the print head should not touch the upper edge of the maintenance unit. On the one hand, the upper edge may be soiled, on the other hand, the two merely touching may already scratch and functionally damage the print head.

Due to manufacturing tolerances, the gap cannot be reduced at will. In addition, thermal expansion or chemical swelling may alter the dimensions of device parts and thereby in turn affect the gap. Experiments have shown that a gap of 0.5 mm is particularly suitable, according to the invention, for print heads with surface area dimensions of approximately 200×200 mm.

Such a device, if it contains a quantity of liquid, may already serve, despite its passive character, as a capping for the print head. The medium evaporating in the trough escapes only slowly through the gap. The print head remains protected against drying out for a certain time.

The protection time can be extended substantially by providing a liquid feed. According to the invention, an inlet may be provided in the trough. Capping liquid may be conveyed into said inlet by a pump. In this case, limiting the liquid level helps to prevent the print head or the rest of the device from being inadvertently flooded. An outlet may be provided whose inlet edge defines the liquid level.

If any unforeseen deformation or soiling beyond the normal measure occurs in the device, the maintenance unit and the print head may collide despite the gap provided between them.

The effect of such a collision may be mitigated by spring-mounting the maintenance unit. So, if it collides with the print head, the maintenance unit is pushed out of the way in a downward direction. This push may be detected in addition and the production process may be stopped.

The above-described trough may accommodate further elements for print head maintenance. For instance, the trough may be used directly to store the fluid during purging of the print head. The liquid being pushed through the head in this process then flows out via the trough. If the fluid from the print head is suitable, it may also be used at the same time for moistening/maintaining the atmosphere in the capping.

The cleaning function may also be integrated in the trough. In the simplest case, a wiping lip is integrated. Said wiping lip protrudes somewhat over the upper edge of the trough. As the print head moves over the lip, any droplets attached to the print head are removed. The liquid flows out through the outlet of the trough. In addition, liquid nozzles may be integrated to spray down the wiping lip after the wiping process and thereby clean it again. The wiping lip should be soft and reliably contact the print head over the entire length.

The protrusion is less than 2 mm, preferably less than 1 mm and particularly preferably less than 0.5 mm. The lip should be bent slightly as the print head passes over it. Ideally, the lip has a rectangular cross-section, and the bending causes a line-shaped contact. Since the lip touches the print head, it protrudes to a greater or lesser extent, depending on the dimensions selected, over the upper edge of the maintenance unit.

The device may also provide a structure which prevents the droplets of the spitting operation from flying around freely. Said structure is arranged in the trough and just below the nozzles. A distance of 3 mm from the nozzle to a surface of the structure has proved useful in this regard. The microdroplets formed hit the surface and gather there. The surface should be inclined such that the quantity of liquid gathering on it runs off at some point.

EXEMPLARY EMBODIMENT

The example outlined below serves to explain the device and process according to the invention. It shall not limit the potential embodiments of the invention.

The system or unit according to the invention may be used in devices and methods for powder-based 3D printing. The device may be combined with a device for powder bed-based 3D printing.

Figure 1:
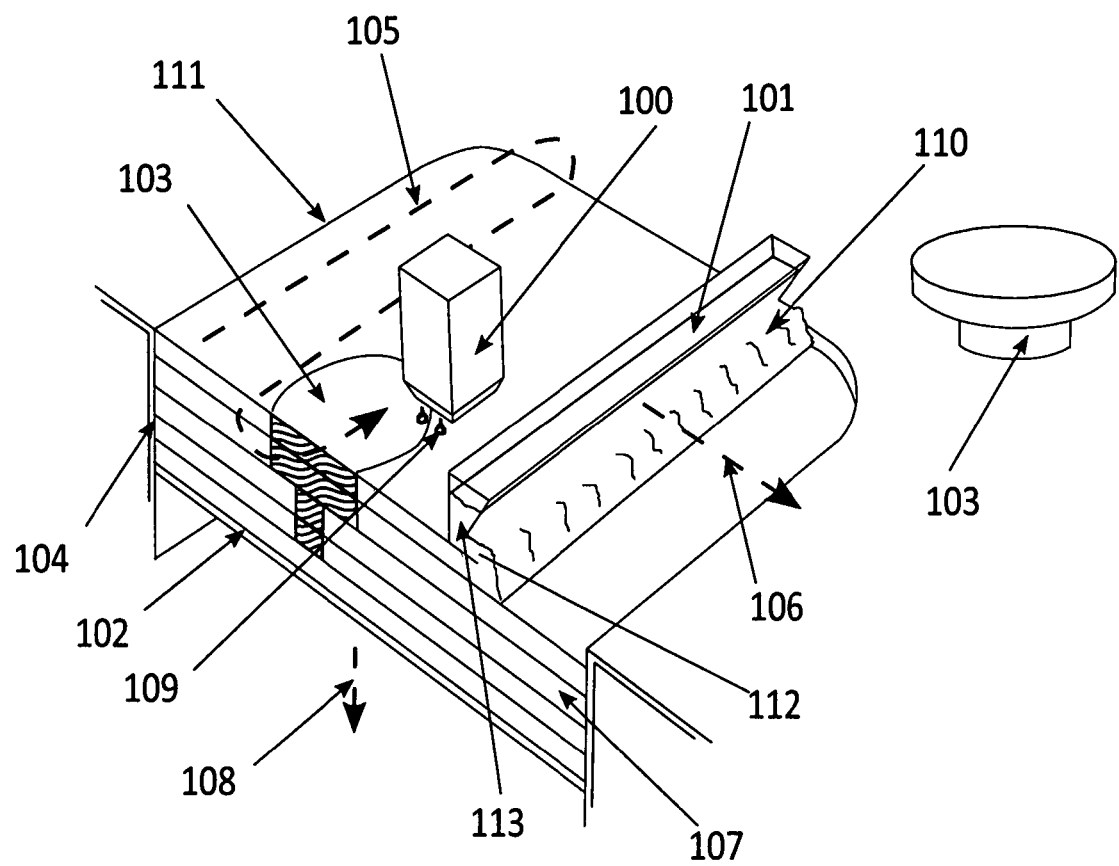
FIG. 1: A schematic representation of the components of a powder-based 3D printer in an oblique sectional view.
Figure 2:
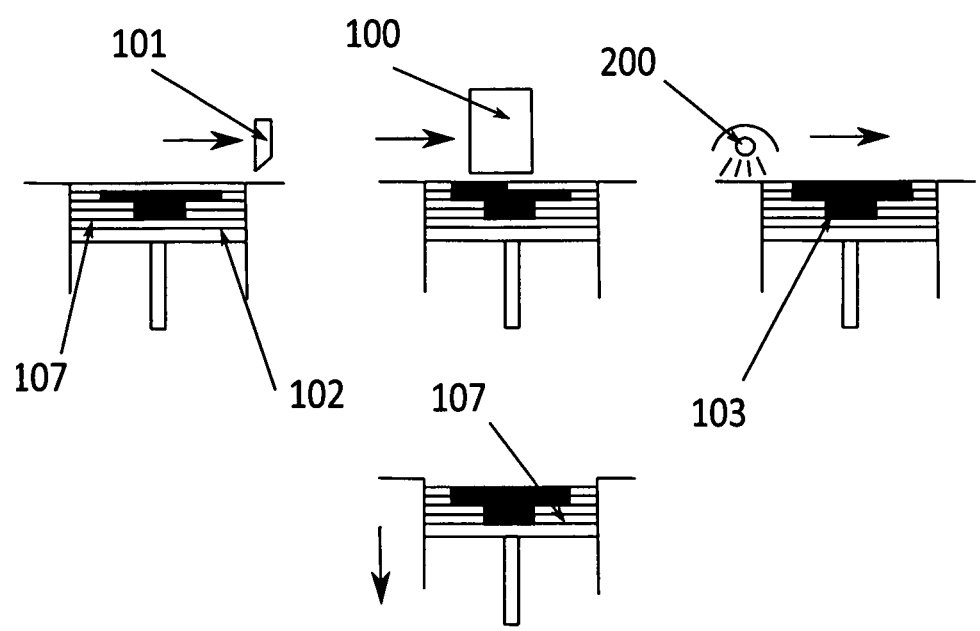
FIG. 2: A schematic drawing of a conventional 3D printing process.

FIG. 1 shows a 3D printing device comprising a powder coater (101). Particulate material is applied onto a construction platform (102) and smoothed by the powder coater (101) (FIG. 2, top left diagram). The particulate material applied may consist of diverse materials. For example, basic molding materials such as sands, artificial sands and ceramic particles may be used. The flow properties of these materials may differ considerably. Various coating techniques allow the forming of layers from dry, free-flowing powders to cohesive, cut-resistant powders or even liquid-based dispersions. The height of the powder layers (107) is determined by the construction platform (102). The construction platform (102) is lowered before application of one layer. In the next coating process, the resulting volume is filled and the excess is smoothed down. The result is an almost perfectly parallel and smooth layer of a defined height.

Figure 3:
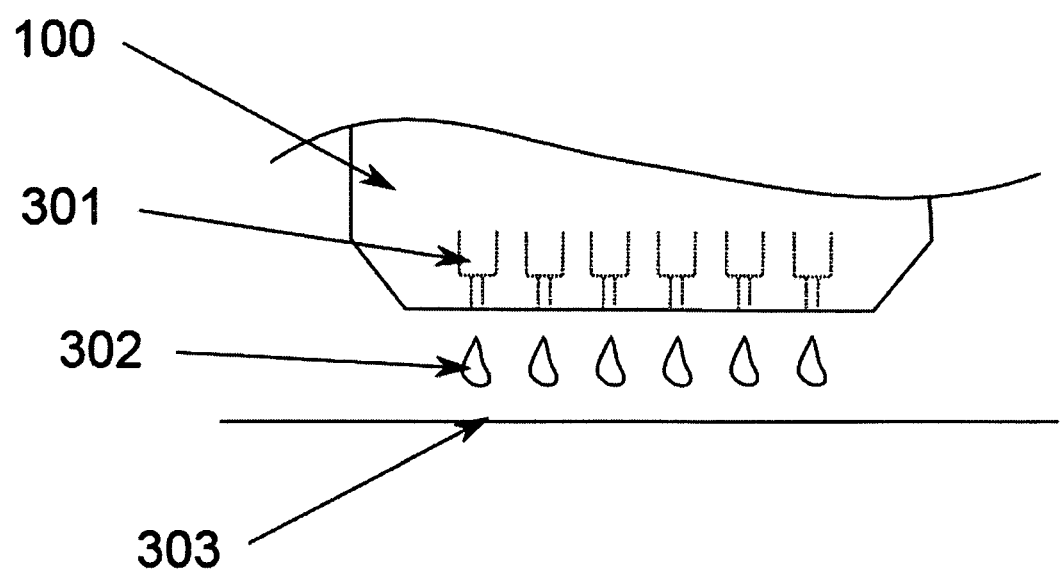
FIG. 3: An illustration of the print head during the discharge of single droplets onto the substrate.

After a coating process, the layer is imprinted with a liquid by means of an inkjet print head (100) (FIG. 2, top center diagram). The print image corresponds to the section through the part at the current construction height of the device. The liquid impacts the particulate material and slowly diffuses into it. A print head during the discharge of single droplets onto the substrate is illustrated in FIG. 3.

Figure 4:
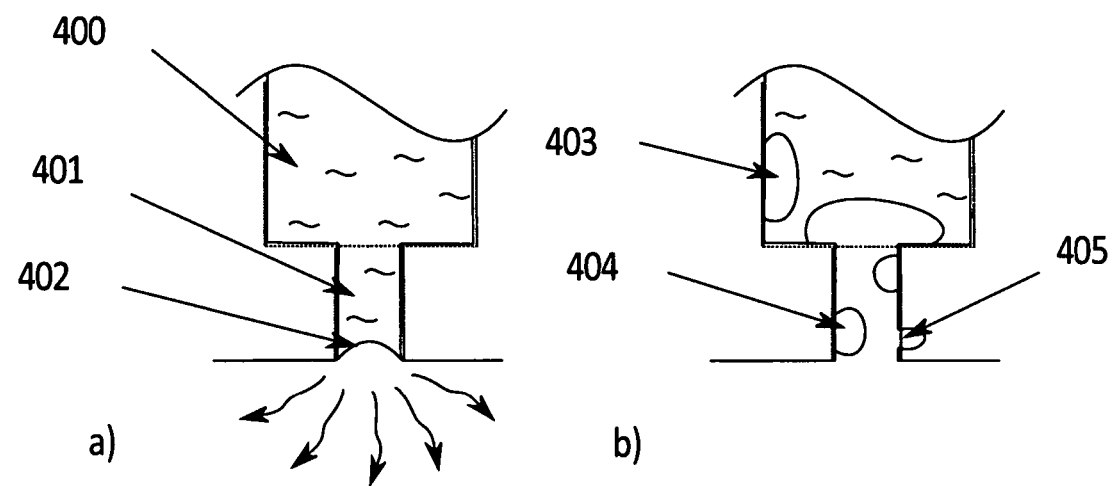
FIG. 4: A representation of the processes within a nozzle when the print head dries out by evaporation of liquid.
Figure 5:
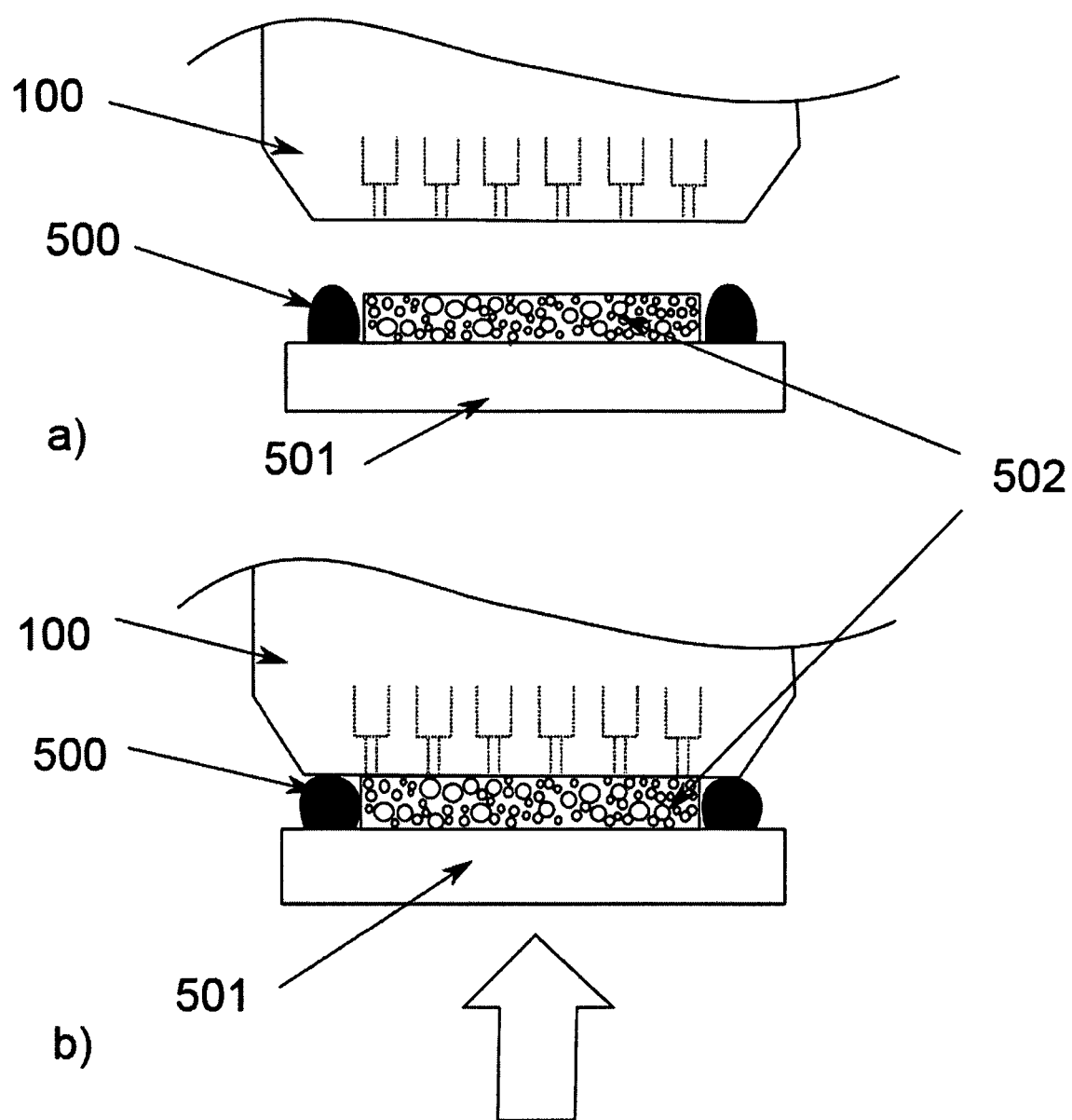
FIG. 5: Representation of a capping principle according to the prior art.
Figure 6:
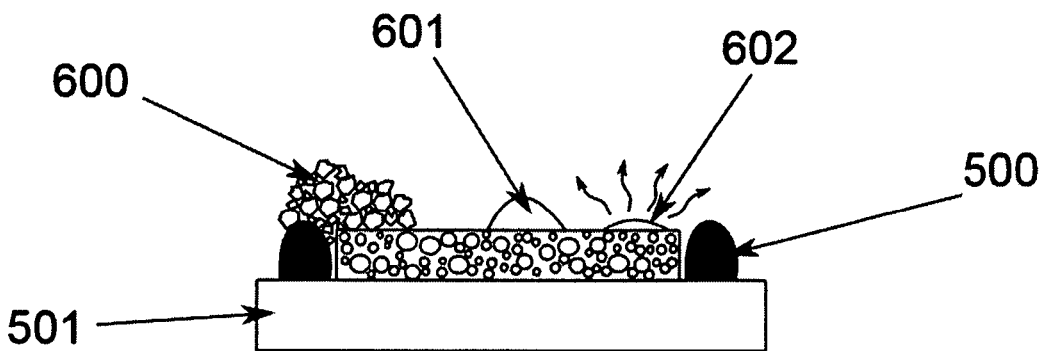
FIG. 6: Influences on the unprotected capping during the printing process/risks for the print head.
Figure 6:
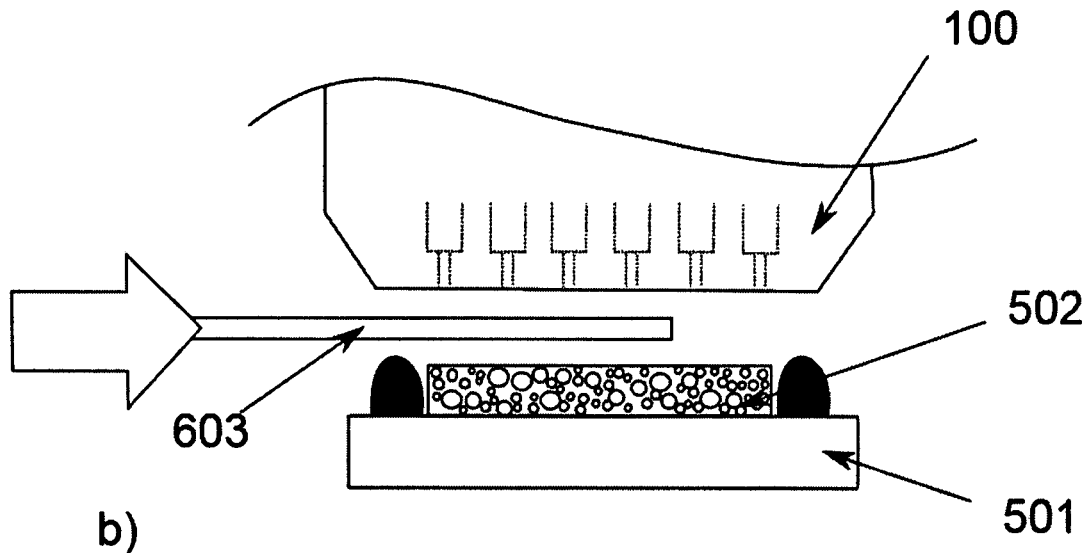
Figure 7:
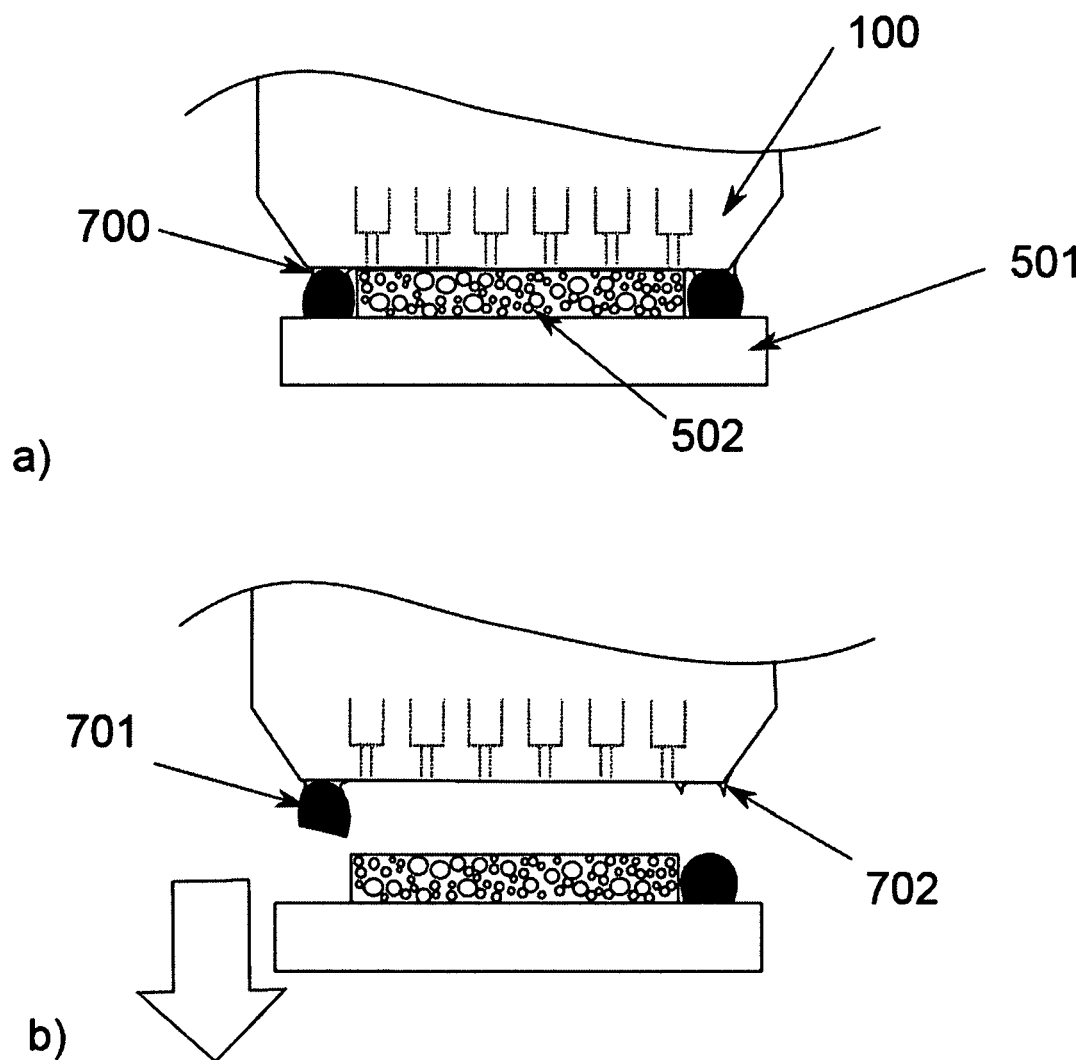
FIG. 7: Problems arising due to the drying off of binder at a contacting seal.

A nozzle of the print head may dry out by evaporation of liquid, as illustrated in FIG. 4, parts a and b.

Maintenance of the print head is performed several times during the construction process. This may be done before or after printing or simultaneously with another step, e.g. the coating step. Maintenance usually consists in purging, cleaning and spitting.

After the printing of the binder, the layer may be optionally heated (FIG. 2, top right diagram). For this purpose, for example, an IR radiator (200) may be passed over the construction field. The radiator may be coupled with the axis of the coating system. During heating, part of the liquid binder evaporates.

After this heating process, the construction platform (102) is lowered by one layer thickness. The layer-forming, printing, heating and lowering steps are repeated only until the desired part (103) has been completed.

After the construction process, the print head is capped. This process is necessary if the 3D printer does not start a subsequent process immediately after the construction process.

Figure 8:
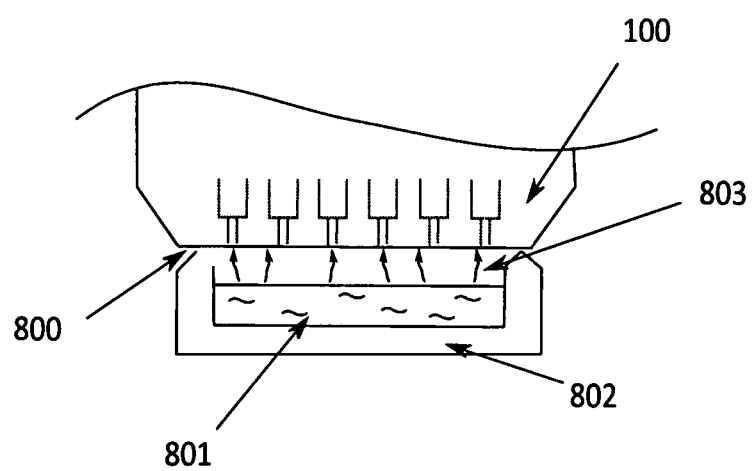
FIG. 8: Representation of the possibility to carry out a capping without using a contacting seal.

In FIG. 8, the printer comprises a maintenance unit which forms a gap seal (800).

The maintenance unit consists of a plastic trough (802). The contour of the trough is milled. The upper edge of the trough has a circumferential chamfer with an angle of 45° and a length of 3 mm. The trough (802) is milled to a depth of 30 mm.

Figure 9:
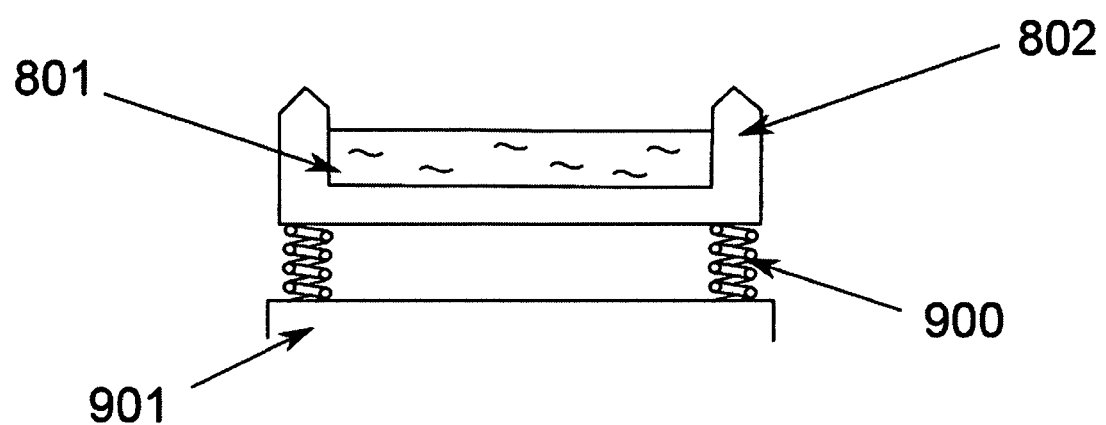
FIG. 9: Protection of the print head during collision with an incorrectly adjusted capping.

In FIG. 9, the trough (802) is connected to the stationary part (901) of the printer via coil springs (900). In this case, the springs (900) push the trough (802) against an upper stop. The overall spring force exceeds the weight force of the filled trough by 20 N. There are four springs.

The upper stop can be adjusted via screws. This allows the trough to be precisely adjusted with respect to the print head. The distance from the upper edge of the trough to the print head is adjusted to 0.5 mm.

Figure 10:
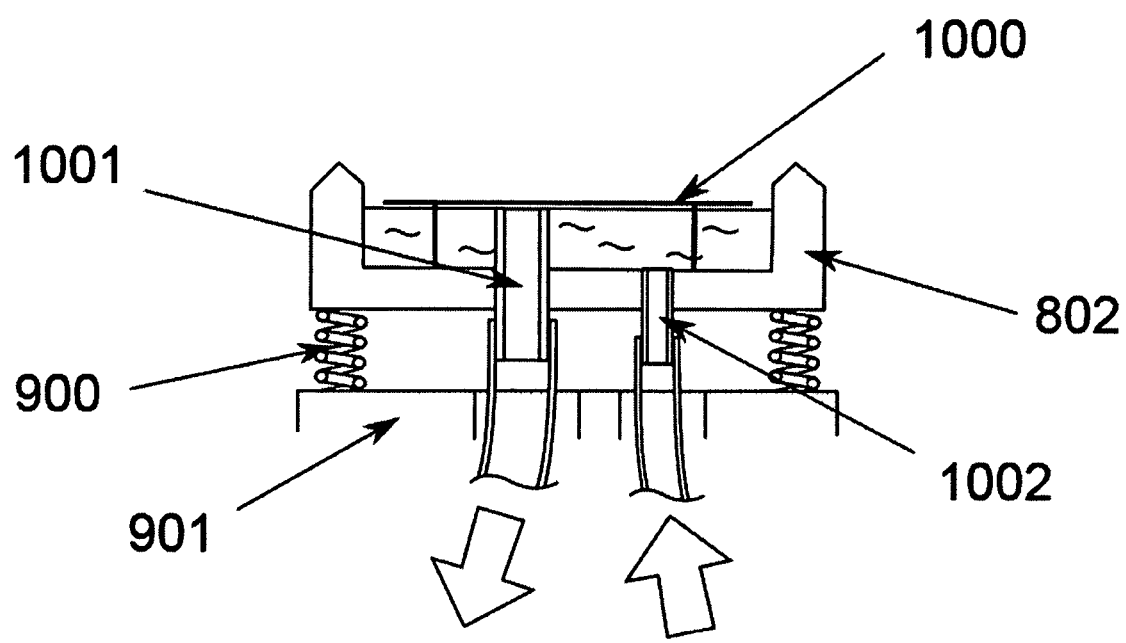
FIG. 10: Fluid system for implementing the capping principle.

In FIG. 10, the trough has a connector (1002) for the capping liquid (801). It terminates in a flexible tube below the trough, said flexible tube being connected to a pump and a storage reservoir of the machine.

In FIG. 10, a second connector is provided for the overflow of liquid (1001) from the trough (802). This connector also terminates in a flexible tube which has a larger diameter than the supply tube. The overflow connection protrudes approx. 20 mm above the bottom of the trough. This prevents the fill level exceeding 20 mm, because otherwise the liquid pumped in will immediately flow out again.

In FIG. 10, a plate (1000) is mounted approx. 2 mm above the overflow connection. Said plate constitutes the anti-spill element. It prevents fluid squirting from the trough toward the print head in a collision.

Figure 11:
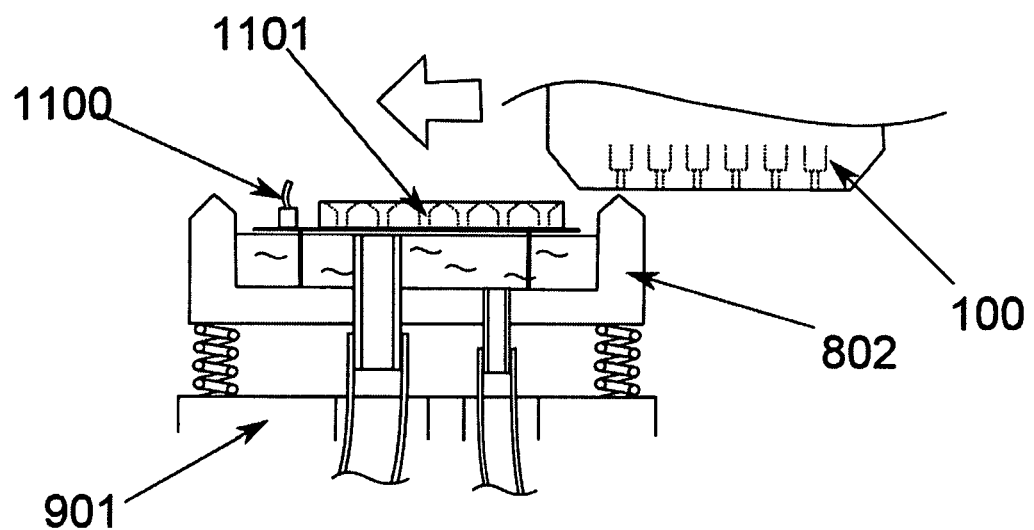
FIG. 11: Integration of several functions into the protected, gap-sealed space.

In FIG. 11, part of the anti-spill element is a support for a wiping lip (1100). The latter is dimensioned such that it protrudes approx. 0.5 mm from the lower edge of the print head. It has a thickness of 1 mm and bends out of the way when the print head passes over it. Due to its rectangular profile, the lip wipes the print head by contacting it in a line-shaped manner.

Also mounted above the anti-spill element is the spitting structure (1101). It consists of a number of elongated holes in a plastic block. The elongated holes are chamfered at an angle of 45°. The chamfers are functional surfaces and their spacing correlates with the arrangement of the rows of nozzles of the inkjet print head. The distance from the spitting structure (1101) is approximately 1.5 mm. The distance at which a droplet flies with respect to the chamfer is some 3 mm.

A maintenance process during a printing process is performed as follows:

The print head moves to the position of the trough (802). In this case, the rectangular base of the print head (100) is centered above the rectangular surface of the trough (802).

For purging, overpressure is applied to the tank in the print head. The nozzles (301) are now purged with a large quantity of fluid. This is to remove any air bubbles (403) potentially present in the fluid system. An overpressure of 0.4 bar is applied for approximately 1 second. This purges some 20-30 g of fluid into the trough.

The fluid flows through the spitting structure (1101) into the trough (802). If the capping is already filled, an equivalent amount of liquid flows out of the overflow connection (1001).

Next, the print head (100) is moved over the wiping lip (1100). The movement causes any droplets still attached to the print head (100) after purging to be removed. During the movement, the lip (1100) bends, and the edge of the wiper (1100) ensures tight contact by which the print head (100) is cleaned in a manner leaving little residue.

During the return movement, the lip (1100) cleans the print head (100) again. After cleaning, the print head is actuated. For this purpose, a few droplets are generated. Thus, the print head is already in the retracted state when it arrives at the construction field of the device.

The generated droplets (302) impact the chamfer of the spitting structure (1101). They collect on the chamfer until their quantity is large enough to cause one large drop consisting of many micro droplets to slide down and drip into the trough (802).

After the spitting, the maintenance process is finished and the print head can return to productive operation.

After the complete construction process, the print head is moved over the maintenance device (position of trough (802)) again. Thus, the print head is protected against drying out. Also, dust (600) cannot soil it in the processes following now, such as removing the construction container (104) from the 3D printer.

The liquid (801) in the trough dries off over a long period of time. Experiments have shown that, using the above arrangement and water as the capping fluid, the print head stays moist for approximately 1 week without any other measures.

This time can be extended at will by pumping fluid into the trough. In this manner, an idle time of the printer of several weeks can be bridged by automatic control.

LIST OF REFERENCE NUMERALS

- 100 print head
- 101 coater
- 102 construction platform
- 103 part
- 104 construction container
- 105 print head path
- 106 coater path
- 107 powder layers
- 108 direction of the construction platform movement
- 109 metered droplets
- 110 powder roll
- 111 construction field edge
- 112 coater gap
- 113 coater reservoir
- 200 IR radiator
- 301 nozzles
- 302 droplets
- 303 substrate/particulate material layer
- 400 pump chamber
- 401 nozzle channel
- 402 meniscus
- 403 air pocket
- 404 drying residue
- 405 corrosion attack
- 500 seal
- 501 prop
- 502 sponge
- 600 particulate material soiling
- 601 fluid soiling
- 602 capping residue
- 603 covering slider
- 700 binder soiling
- 701 torn-off seal
- 702 cured binder residue
- 800 gap seal
- 801 capping fluid/liquid
- 802 capping trough
- 803 evaporated fluid
- 900 spring
- 901 frame
- 1000 anti-spill element
- 1001 overflow siphon/outlet
- 1002 inlet
- 1100 wiping lip
- 1101 spitting structure

What is claimed is:

1. A unit for a print head having nozzles, wherein the unit is for maintenance of the print head, for parking of the print head, or both, characterized in that said unit includes a wall, wherein when the print head is retracted into the unit, the wall and the print head are separated by a gap seal, all of the nozzles of the print head open towards a space formed by the unit and print head, and the gap seal protects the print head from drying out between production of 3D parts.

2. The unit of claim 1, characterized in that the unit comprises a trough which is sealed by the gap seal and can be filled with a capping liquid, optionally wherein the capping liquid in the trough helps keep the print head moist without contacting the print head.

3. The unit according to claim 2, wherein the unit comprises a liquid inlet and outlet and a first liquid connection for the capping liquid and a second liquid connection for overflow or draining of the capping liquid, the first and/or the second liquid connection is connected to one or more tubes including a tube connected to a storage reservoir a pump for filling the trough.

4. The unit of claim 2, characterized in that the trough has a chamfer.

5. The unit according to claim 2, characterized in that the unit comprises flexible means, optionally coil springs and a stop, against which the trough can be moved by the flexible means, wherein the gap distance from the print head to an upper edge of the trough is 0.1 to 5 mm.

6. The unit of claim 1, wherein a distance of the gap seal is adjustable.

7. The unit of claim 1, wherein the unit includes a stop which creates a defined gap distance between the unit and the print head of 0.1 to 5 mm.

8. The unit of claim 7, wherein the unit includes a trough for a capping liquid, and a drain for an overflow of the capping liquid.

9. The unit of claim 8, wherein the stop that is adjustable.

10. The unit of claim 8, wherein the unit includes a tube connected to a storage reservoir or a pump for filling the trough.

11. The unit of claim 1, wherein the unit is an integrated unit for both maintenance of the print head and parking of the print head.

12. A system comprising a coater for applying a powder, a print head having nozzles for selectively printing a printing liquid, and a unit for maintenance of the print head, for parking of the print head, or both, wherein the print head, in its position retracted into the unit, substantially does not touch the components of the unit and includes a gap seal between a wall of the unit and the print head, wherein all of the nozzles of the print head open toward a space formed by the unit and the print head.

13. The system according to claim 12, characterized in that [the unit comprises a trough for filling with a capping liquid, optionally wherein the capping liquid in the trough helps keep the print head moist without contacting the print head.

14. The system according to claim 13, wherein the system comprises a liquid connection for draining an overflow of the capping liquid from the trough.

15. The system according to claim 13, characterized in that the trough has a chamfer.

16. The system according to claim 13, characterized in that the unit comprises flexible means, optionally coil springs
and an upper stop, against which the trough can be moved by the flexible means
wherein the gap distance from the print head to an upper edge of the trough 0.1 to 5 mm.

17. The system according to claim 12, characterized in that the unit includes a flexible means and a bending force or spring force of the flexible means is greater than a weight force of the trough filled with liquid.

18. The system of claim 12, wherein a distance of the gap seal is adjustable.

19. A method for parking a print head in a 3D printer, wherein the method comprises a step of;
   moving a print head from a construction field to a parking or maintenance unit;
   wherein the print head and a wall of the parking or maintenance unit form a cavity and all of the nozzles of the print head open towards the cavity, wherein the unit and the print head are separated by a gap seal between the wall of the parking or maintenance unit and the print head.

20. The method according to claim 19, wherein the unit is approached by the print head, without substantially touching the unit so that the gap seal has a distance of 0.1 to 5 mm.

21. The method of claim 19, wherein the print head remains moist after being parked in the unit.

22. The method of claim 19, wherein the unit includes a trough and the method includes applying an overpressure to a tank of the print head for purging the nozzles with a liquid into the trough.

23. A unit for a print head having nozzles,
   wherein the unit cleans the print head and caps the print head at one station; and
   the unit includes a stop for setting a gap distance between an edge of a trough and the print head.

24. The unit of claim 23, wherein the unit includes a wiping lip that removes a liquid from the print head and a trough that holds a capping fluid.

25. The unit of claim 24, wherein the wiping lip bends and contacts the print head over an entire length of the print head.

26. The unit of claim 23, wherein the stop is adjustable, and is set before the unit caps the print head.

* * * * *